United States Patent
Liebelt et al.

(10) Patent No.: US 9,600,218 B2
(45) Date of Patent: Mar. 21, 2017

(54) DOCUMENT-SPECIFIC WORKFLOW HISTORIES FOR MULTI-DOCUMENT PRINT JOBS

(71) Applicants: Linda Sue Liebelt, Boulder, CO (US); Michael Glen Lotz, Longmont, CO (US); Kyle P. Manning, Fruit Heights, UT (US); Marquis G. Waller, Beverly, OH (US); Amber Joy Watkins, Longmont, CO (US)

(72) Inventors: Linda Sue Liebelt, Boulder, CO (US); Michael Glen Lotz, Longmont, CO (US); Kyle P. Manning, Fruit Heights, UT (US); Marquis G. Waller, Beverly, OH (US); Amber Joy Watkins, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/675,519

(22) Filed: Mar. 31, 2015

(65) Prior Publication Data
US 2016/0291911 A1    Oct. 6, 2016

(51) Int. Cl.
*G06F 3/12*    (2006.01)

(52) U.S. Cl.
CPC .......... *G06F 3/1273* (2013.01); *G06F 3/1263* (2013.01); *G06F 3/1275* (2013.01); *G06F 3/1296* (2013.01)

(58) Field of Classification Search
CPC .................................................... G06F 3/1273
USPC ............................................... 358/1.15, 1.13
See application file for complete search history.

(56) References Cited

U.S. PATENT DOCUMENTS

| | | | |
|---|---|---|---|
| 6,728,947 B1 * | 4/2004 | Bengston | G06Q 10/06 705/7.27 |
| 7,973,955 B2 | 7/2011 | Emerson | |
| 8,184,329 B2 | 5/2012 | Nakatsuka | |
| 8,274,689 B2 | 9/2012 | Itoh et al. | |
| 8,670,148 B2 | 3/2014 | Murakami et al. | |
| 8,687,213 B2 | 4/2014 | Hoarau et al. | |
| 8,711,412 B2 | 4/2014 | Tokumoto | |
| 2010/0123930 A1 | 5/2010 | Tomizawa | |
| 2011/0066269 A1 * | 3/2011 | Zhou | G05B 19/41865 700/101 |
| 2012/0086966 A1 | 4/2012 | Takagi | |

(Continued)

*Primary Examiner* — Jacky X Zheng
(74) *Attorney, Agent, or Firm* — Duft Bornsen & Fettig LLP

(57) ABSTRACT

Systems and methods are provided for generating document-specific histories for multi-document print jobs. One system is a workflow server with an interface and a controller. The interface receives a print job that defines multiple documents, and the controller directs devices of a print shop in accordance with a print workflow. The controller identifies properties of each of the documents to track while the print job is being processed in the workflow, receives progress information from the devices, and analyzes the progress information to detect a triggering event indicating that a document in the workflow has transitioned to a new state at an activity. When recording criteria direct the controller to update the history, the controller adds an entry to a history file while the document is in the workflow. The entry indicates values of the properties of the document, as well as a current workflow activity for the document.

20 Claims, 7 Drawing Sheets

(56) References Cited

U.S. PATENT DOCUMENTS

| | | | | |
|---|---|---|---|---|
| 2012/0218591 A1* | 8/2012 | Dumitrescu | ......... | G06F 3/1204 358/1.15 |
| 2012/0250075 A1* | 10/2012 | Dumitrescu | ......... | G06F 3/1204 358/1.15 |
| 2014/0036311 A1 | 2/2014 | Sato | | |
| 2014/0211256 A1 | 7/2014 | Hosotsubo | | |

\* cited by examiner

FIG. 5

| TIMESTAMP | EVENT TYPE | STATE | ACTIVITY | WORKFLOW |
|---|---|---|---|---|
| Feb. 12, 2015, 1:10:35 PM | CHANGED STATUS | PROCESSING | PRINT | STATEMENT |
| Feb. 12, 2015, 1:10:36 PM | CHANGED STATUS | QUEUED | MAIL | STATEMENT |
| Feb. 12, 2015, 1:10:36 PM | CHANGED STATUS | COMPLETE | PRINT | STATEMENT |
| Feb. 12, 2015, 1:10:36 PM | CHANGED STATUS | FAILED | PRINT | STATEMENT |
| Feb. 12, 2015, 1:12:01 PM | CHANGED STATUS | COMPLETE | MAIL | BOOK |
| Feb. 12, 2015, 1:12:07 PM | CHANGED STATUS | QUEUED | PRE-FLIGHT | STATEMENT |
| Feb. 12, 2015, 1:12:07 PM | CHANGED STATUS | QUEUED | INSERT | STATEMENT |
| Feb. 12, 2015, 1:12:10 PM | CHANGED STATUS | PROCESSING | MAIL | STATEMENT |
| Feb. 12, 2015, 1:12:13 PM | CHANGED STATUS | QUEUED | RECEIVE | CREDIT REPORT |
| Feb. 12, 2015, 1:12:14 PM | CHANGED STATUS | PROCESSING | PRINT | STATEMENT |
| Feb. 12, 2015, 1:12:22 PM | TIME IN WORKFLOW | > 6 HOURS | INSERT | STATEMENT |
| Feb. 12, 2015, 1:12:47 PM | CHANGED STATUS | COMPLETE | PRINT | STATEMENT |
| Feb. 12, 2015, 1:12:58 PM | CHANGED STATUS | PROCESSING | PRINT | STATEMENT |

500

DOCUMENT-SPECIFIC WORKFLOW HISTORIES FOR MULTI-DOCUMENT PRINT JOBS

FIELD OF THE INVENTION

The invention relates to the field of print job management, and in particular, to workflow systems for a print shop.

BACKGROUND

Print shops are typically medium or large scale facilities capable of supplying printing services to meet a variety of customer demands. For example, print shops are often used to print documents for mass-mailing (e.g., bills, advertisements, etc.). Because print shops engage in printing on a scale that is hard to match, their customer base is usually varied. Print shop customers may therefore include both large institutional customers (e.g., credit card companies and banks), and small customers (e.g., small businesses and churches).

Print shops are generally arranged to print incoming jobs from customers in a way that is economical, yet fast. Thus, print shops often include a number of high-volume printers capable of printing incoming jobs quickly and at high quality. Print shops also typically include post-printing devices that process the printed documents of each job (e.g., stackers, staplers, cutters, binders, etc.). Print shops may also provide digital/web publishing, e-mail, or other multimedia services to customers. Because print shops serve a variety of customers, they are often tasked with processing jobs that have varying printing formats, delivery dates, and media requirements. Print shops therefore often use a centralized server that coordinates activity between printers and other devices of the print shop. However, print shop operators continue to desire enhanced servers capable of providing enhanced analysis of print jobs as they travel through a workflow.

SUMMARY

Embodiments described herein dynamically track and store the properties of individual documents in a multi-document print job being processed in a workflow. This enables the generation of an archive/history showing how each of the documents was processed in the workflow. This information in turn allows a print shop operator to identify processing inefficiencies at the print shop with a granularity that was not possible in prior systems.

One system is a workflow server with an interface and a controller. The interface receives a print job that defines multiple documents, and the controller directs devices of a print shop in accordance with a print workflow that comprises an ordered set of activities to perform upon the documents. Each activity has a queued state, a processing state, and a complete state. The controller identifies properties of each of the documents to track while the print job is being processed in the workflow, receives progress information from the devices, and analyzes the progress information to detect a triggering event indicating that a document in the workflow has transitioned to a new state at an activity. The controller also analyzes recording criteria for the document to determine whether to update a history for the document in response to the triggering event, and when the criteria direct the controller to update the history, the controller adds an entry to a history file for the document while the document is in the workflow. The entry indicates values of the properties of the document during the triggering event, as well as a current workflow activity for the document during the triggering event.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

FIG. 5 is a block diagram illustrating a history file in an exemplary embodiment.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
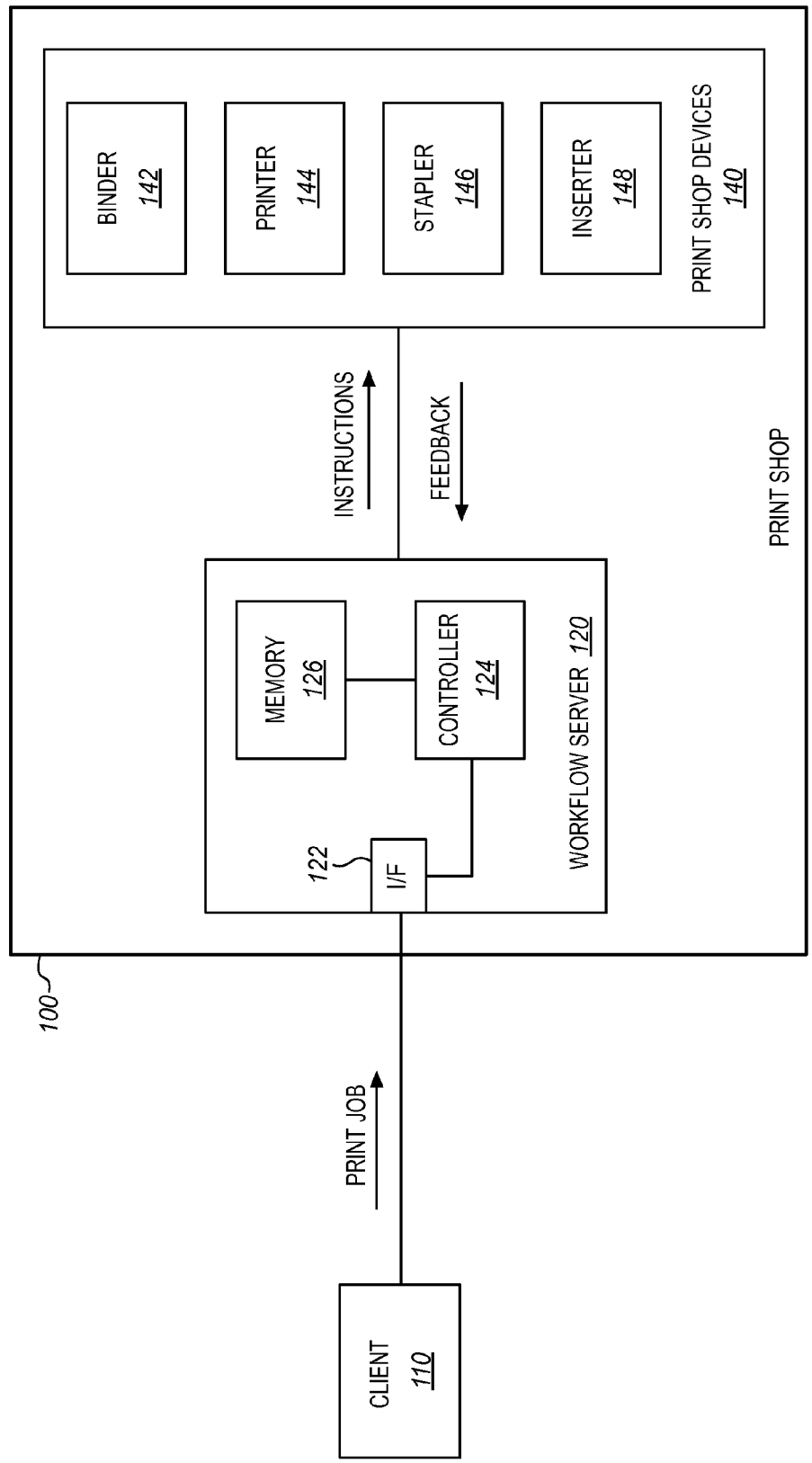
FIG. 1 is a block diagram of a workflow system in an exemplary embodiment.

FIG. 1 is a block diagram of a workflow system 100 in an exemplary embodiment. In workflow system 100, an incoming job (e.g., a print file and accompanying job ticket) is received from client 110 at workflow server 120. Workflow server 120 reviews the incoming print job, and identifies a workflow for the print job. A workflow is an organized set of print shop activities to perform for the print job, and a workflow may be stored as data on workflow server 120 that defines each activity as well as an overall order in which to perform the activities. A workflow may be selected from pre-defined templates as desired. After a workflow has been chosen, workflow server 120 directs the devices of the print shop in accordance with the workflow to ensure that the print job is properly handled at the print shop.

Workflow system 100 has been enhanced to generate and modify a history of each document in a print job, and to update the history as the documents are being actively processed in the workflow. In one embodiment, a history indicates changes in status of one or more of the documents in the print job as the documents travel between workflow activities. A history may describe any suitable properties of a document (and accompanying contextual information) that have been determined while the document is still being processed in the workflow. For example, an exemplary history may include the time that changes/events occurred for a given document or print job. Including the time in the history provides a sequence of events that may be correlated with activities outside of the print shop. In this embodiment, workflow server 120 includes an interface (I/F) 122 (e.g., an Ethernet interface, wireless interface, etc.) for receiving print data for print jobs from client 110. Workflow server 120 further includes a controller 124 for managing print jobs received at workflow server 120, and a memory 126 (e.g., Random Access Memory (RAM), a hard disk, etc.) for storing print jobs from client 110. Controller 124 may be implemented as custom circuitry, a processor executing programmed instructions, etc.

Print shop devices 140 include the devices and components of the print shop that perform the various activities described herein. For example, print shop devices 140 may include printers, post-printing machinery, e-mail or web publishing servers, etc. The print shop devices illustrated in FIG. 1 provide an example of the variety of print shop devices that may be utilized by a print shop. In this embodiment, binder 142 operates to bind printed pages into magazines or books, printer 144 operates to rasterize and print incoming print data onto physical pages, stapler 146 staples groups of pages together, and inserter 148 inserts physical pages into envelopes for mailing/delivery to recipients.

The particular arrangement, number, and configuration of components described herein is exemplary and non-limiting. Illustrative details of the operation of workflow system 100 will be discussed with regard to FIG. 2. Assume, for this embodiment, that client 110 has generated a print job for processing by the print shop, and has transmitted print data and a job ticket for the print job to workflow server 120.

Figure 2:
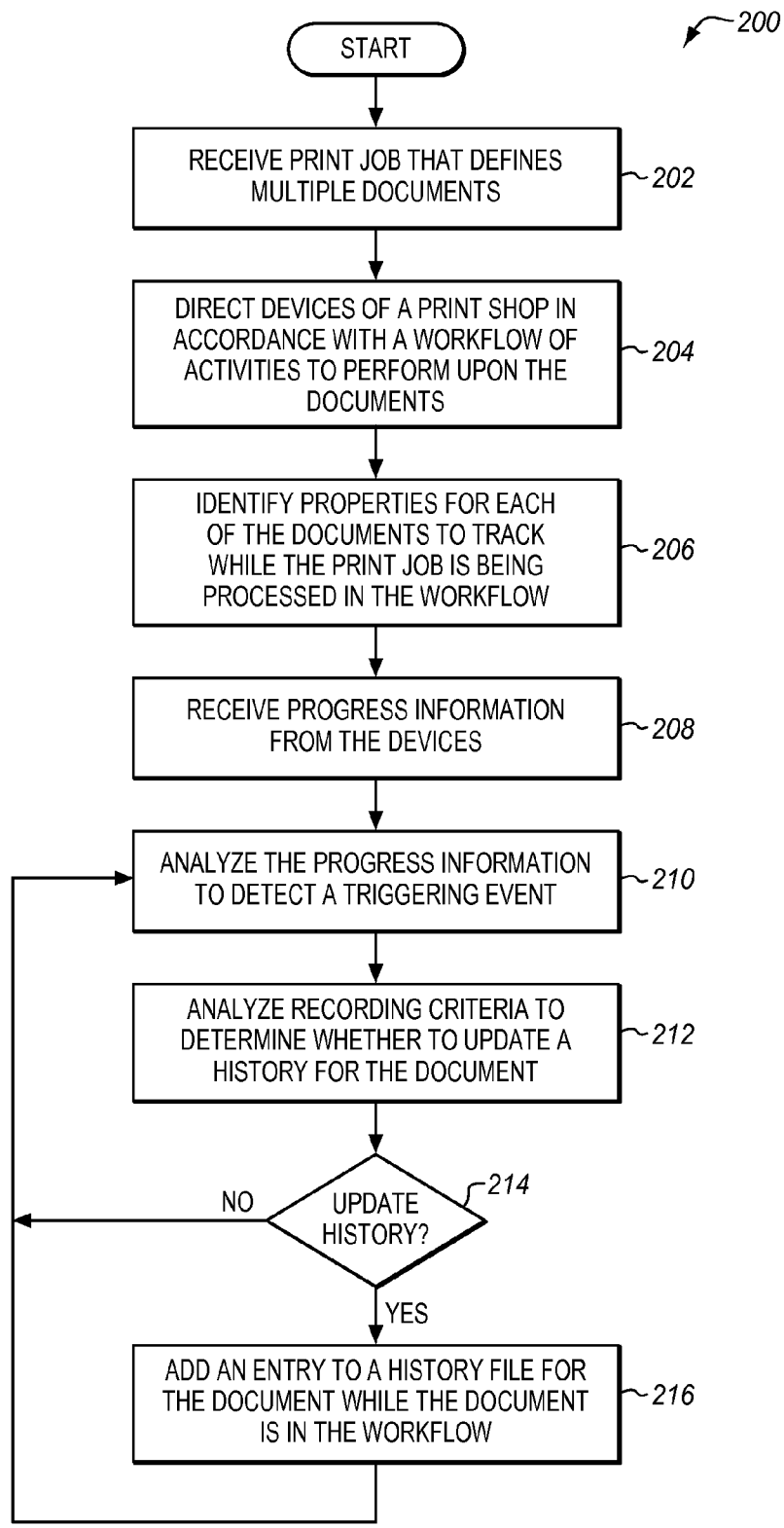
FIG. 2 is a flowchart illustrating a method for operating a workflow system in an exemplary embodiment.

FIG. 2 is a flowchart illustrating a method 200 for operating a workflow system in an exemplary embodiment. The steps of method 200 are described with reference to workflow system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, I/F 122 receives a print job that includes multiple documents from client 110. Each of the documents may indicate an intended recipient for delivery. That is, a job ticket for the print job may identify a recipient for each document, or each document may include print data that identifies a recipient. As used herein, a "document" may be an independent portion of a print job that is directed to a specific recipient for delivery (e.g., a single piece of mail). Thus, multiple documents may be defined in a single file of print data for a print job.

Alternatively, a document may be considered an independent portion of a print job that does not require other portions of the print job in order to maintain its whole context or meaning. For example, an individual chapter of a book is not a document, because the chapter needs to be read along with the other chapters of the book in order to be fully understood. In contrast, in a print job with thousands of bank statements where each bank statement is intended for delivery to a different account holder, each bank statement is a complete document in and of itself. The print data for the received print job may be formatted in a single file according to a Page Description Language (PDL), for example as an Advanced Function Presentation (AFP) datastream, or as Portable Document Format (PDF) print data accompanied by Job Definition Format (JDF) job ticket instructions. Controller 124 may further analyze the print job to identify each document, as well as to determine information indicating the recipient of each document (e.g., account number, recipient name, address, etc.).

After the print job has been received, controller 124 selects a workflow for the print job. In one embodiment, workflow system 100 implements multiple "hot folders" or interfaces that are each associated with a different workflow, and client 110 submits a print job to one of the hot folders at workflow server 120 in order to indicate a desired workflow. In a further embodiment, a combination of print job name and hot folder is used to identify a workflow for the print job.

The workflow defines an ordered set of print shop activities that are stored in memory (e.g., in memory 126). For example, the workflow may include configurable activities for directing a printer to print, or directing an inserter to insert documents into an envelope. When properly assembled and configured, the workflow comprises the digitally-defined order of operations to perform at the print shop in order to handle the print job properly. That is, the activities defined in the workflow, when performed in order, enable workflow server 120 to communicate with/manage the print shop devices and process the print job as desired. Each activity in a workflow may be associated with a category or type of print shop device (e.g., post-processing devices, printers, inserters) and may also be associated with specific named print shop devices. These activities may include printing or non-printing activities (e.g., billing, shipping, document review, multimedia/digital/internet activities, credit checks, etc.) as desired. Furthermore, each activity is associated with different states which a print job (or document thereof) may occupy. The queued state indicates that a document (or job) is presently ready for processing by the activity, the processing state indicates that a document (or job) is actively being processed in an activity (e.g., is actively being printed/stapled by a corresponding device), and the complete activity indicates that a document (or job) is ready to transition to the next activity in the workflow.

Further states may exist for each activity, including a waiting state wherein a document is manually "paused" and processing is halted for that specific document with respect to the activity, until user input indicates that the document may resume processing. Another state may be an error state encountered when a print shop device encounters an error in handling the document (e.g., a paper jam, a rasterization error, instructions for the document that are contradictory, etc.). In the error state, the document itself may be paused while the print shop device continues to process other documents, or the print job (or a portion thereof) in the workflow may be halted. For example, a paper jam may cause printing for the current document and all subsequent documents in the print job to pause. In a further embodiment, the printing activity includes a printing state as well as a processing state. The processing state for the printing activity indicates rasterization occurring for the print job, while the printing state indicates that pages are being marked to print the documents.

In step 204, controller 124 directs print shop devices 140 to process the print job in accordance with the workflow. Directing the individual print shop devices 140 may comprise identifying the current activity that has been reached in the workflow, sending instructions to the appropriate print shop device based on the current activity, awaiting feedback from the device indicating that processing has successfully completed for the workflow activity, and advancing the print job to the next workflow activity (as internally tracked by controller 124). Advancing the print job may comprise transmitting new instructions to the next print shop device that will be handling the print job. Controller 124 may track the current activity on a document-by-document basis or may track the current activity for the entire print job as a whole.

In step 206, controller 124 identifies properties for each of the documents to track while the print job is being processed in the workflow. As used herein, a property of a document is a piece of information describing the document itself, and/or how the document is being processed as it moves through a workflow. For example, a property may indicate the number of pages in the document, a time that a workflow activity was performed for the document, a status of the document as the document is being processed, a format of print data for the document, etc. Controller 124 may identify the properties to track based on user input defining those properties, or may access parameters stored in internal memory to determine which document properties to track. Controller 124 may monitor the identified properties continuously, periodically, or in response to triggering events as desired.

In step 208, controller 124 receives progress information from the devices of the print shop. For example, the progress information may be provided via a local intranet, and may indicate a current page of the print job being actively processed by a given print shop device. Based on this information, controller 124 may correlate the page with an individual document of the print job, and may thereby be able to determine which document is being actively processed at which step of the workflow.

After receiving the progress information from the print shop devices, in step 210 controller 124 analyzes the progress information to detect a triggering event indicating that a document in the workflow has transitioned to a new state at an activity. For example, a document's status may change from being queued for processing at an activity to being actively processed at the activity. Thus, the triggering event is an event that occurs at the print shop, and is directly related to the processing of the document in the workflow. In one embodiment, by correlating page-based progress information from a print shop device with individual documents of a print job, controller 124 may determine that a document has just entered or left the processing state of a given activity.

In step 212, in response to detecting the triggering event, controller 124 analyzes a set of recording criteria (e.g., stored in memory 126) to determine whether to update a history for the document or not. The criteria limits the conditions under which a triggering event causes the history to be updated. This is particularly beneficial in situations where triggering events are detected multiple times per second in workflows for large print jobs, as it reduces the processing overhead associated with managing histories for potentially hundreds of thousands of documents in a single print job. Criteria may define, for example, that a history should (or should not) be updated if a triggering event occurs while the document is at a specific workflow activity, if it is a certain time of day, if a document reaches a specific status for a given workflow activity, etc. Controller 124 may further identify print shop devices that are currently processing the document, and transmit queries to those print shop devices in order to determine the current tracked properties of the document when the triggering event occurred.

Controller 124 may identify the history as a history file that includes a log of entries describing the document as the document has progressed through the workflow. This history file may be dedicated specifically to the document itself, or may be used to track all documents for the print job. In step 214, based on the analysis of criteria in step 212, controller 124 decides whether or not to update the history. If controller 124 decides to update the history, controller 124 updates/appends the identified history by adding an entry describing the values of the properties that were being tracked when the triggering event occurred, and a current workflow activity for the document during the triggering event. That is, the entry indicates whether the document is currently in the printing activity, the pre-flight activity, the receive activity, etc. The entry may further include a timestamp indicating when the triggering event occurred, an indication of what the triggering event was, and other information as desired. Processing then returns to step 210, where controller 124 awaits progress information indicating another triggering event. Alternatively, if controller 124 decides not to update the history in step 214, then processing returns directly to step 210 without updating the history file.

In print jobs with millions of pages that take days to print, it may be difficult to determine exactly how one document traveled through the workflow and was manipulated by the various activities of the workflow. Thus, conditionally tracking individual documents of a print job while the print job is actively being processed in the workflow, provides a deep and effective analysis tool to ensure that the print shop is operating efficiently.

In a further embodiment, controller 124 also generates a new snapshot file that links and/or references to the history file by pointing to a location of the history file (and/or the new entry). The new snapshot file provides further contextual information about the triggering event, and includes values for a wide array of additional document properties that were being tracked for the document when the triggering event occurred. The new snapshot file may be substantially larger than the entry in the history file. This allows for the history file to be relatively small and easy to parse, while the snapshot file provides an enhanced level of detail.

In a further embodiment, controller 124 determines the properties of the document during the triggering event by transmitting a query to a print shop device involved in the current workflow activity for the document, and receiving a response indicating progress of the print shop device. Controller 124 may receive the progress information as a page number or percentage completion, and may translate the progress information to determine the status of one or more individual documents being processed by the print shop device. For example, controller 124 may determine that page number one thousand and seventy three corresponds with document number twelve.

EXAMPLES

In the following examples, additional processes, systems, and methods are described in the context of a workflow system that prints and sorts account statements for mass-mailing to customers.

In this example, a workflow server operates on a computer of the print shop that is accessible via the Internet. The workflow server accesses print shop devices via an internal print shop intranet, to which a printer, e-mail server, and inserter of the print shop are connected. An incoming print job is received at the workflow server via the Internet as a PDF print job that includes seven hundred thousand documents. Each of the documents corresponds with a credit card statement for a different account holder, and is a mail piece intended for delivery to a different recipient. A controller at the workflow server loads the print job into memory, and determines that the print job is a "statements" type of print job based on the name of the print job and a file folder of the workflow server where the print job was received. The controller then assigns a workflow to the print job based on the type of job.

Figure 3:
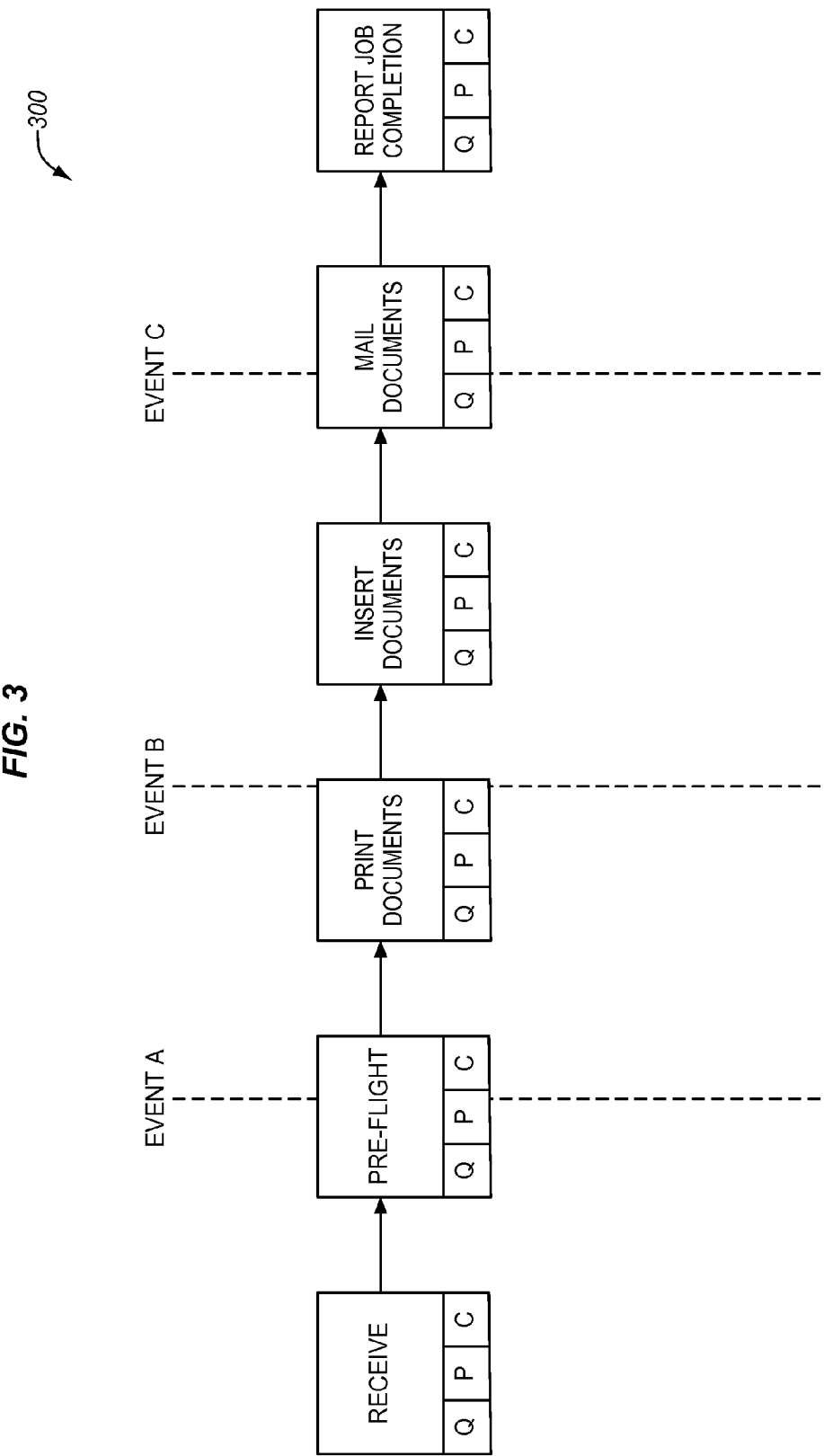
FIG. 3 is a block diagram illustrating a workflow and multiple triggering events in an exemplary embodiment.

FIG. 3 is a block diagram illustrating a workflow 300 assigned by the workflow server to the print job in this example. The workflow includes multiple configurable activities, and documents traveling through the workflow proceed through states for being queued (Q), actively processing (P), and complete (C). A controller of the workflow server keeps track of triggering events based on input by the print shop devices performing each of the activities. In this example, the workflow server itself performs the receive and pre-flight tasks, a printer manages the print documents activity, an inserter performs the insert documents activity, and the mail documents activity is performed via a print shop operator, who utilizes a graphical user interface in order to report completion of various mailings to the workflow server. For the printing activity, the controller receives periodic input from the printer indicating a range of pages from the print job that have completed printing. The controller correlates the range of pages with a set of documents defined in the print job, in order to determine which documents are queued, which document is processing for the activity, and which documents are completed with respect to printing. In this example, the print job includes multiple documents that can each be handled in a different workflow activity as the print job itself is progressing through the workflow.

In this example, triggering events may be detected for various reasons and at various times while a document is moving through the workflow. According to FIG. 3, a document is in the processing state for the pre-flight activity when a first event A is detected, the document has just completed the printing activity when a second event B is detected, and the document is queued for mailing when a third event C is detected. When each of the triggering events is detected, the controller reviews a tracking object in memory to determine whether to archive information for the document.

Figure 4:
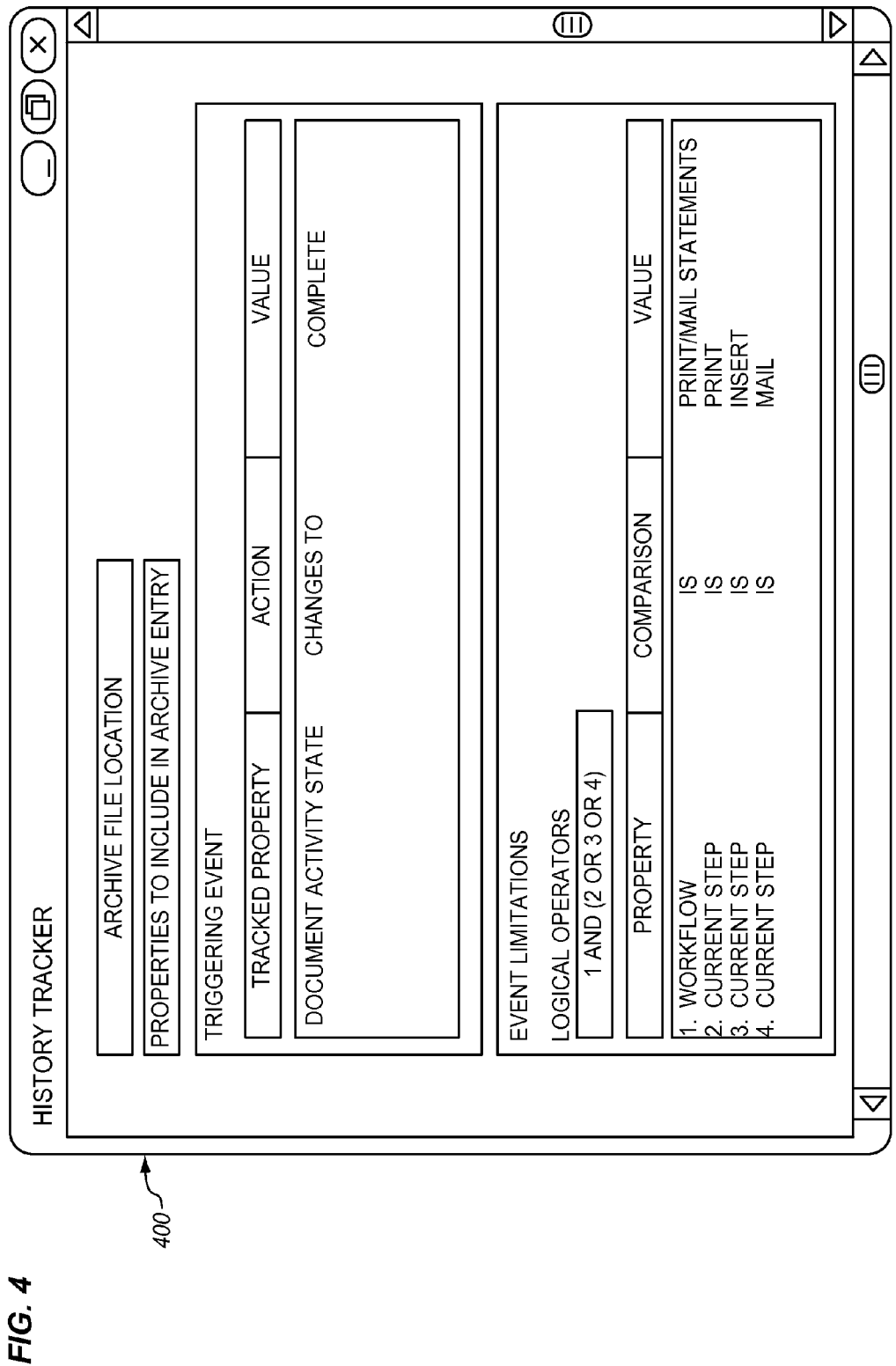
FIG. 4 is a block diagram illustrating a user configurable set of criteria in an exemplary embodiment.

A tracking object is shown as displayed to a user at a software window 400 in FIG. 4. According to FIG. 4, the tracking object includes user-configurable properties, including a pointer to a file location for an archive/history file for a document, a list of properties to add to each new entry in the archive/history file, a list of one or more triggering events (defined by a property, action, and value), a list of event limitations that restrict when a triggering event will cause an entry to be added to the archive/history file, and a set of logical operators that interrelate the conditions into a single logical statement. In this example, a triggering event occurs whenever the state of a document changes with respect to a given activity (e.g., from queued to processing, or processing to complete). However, not all triggering events cause the history file to be updated, because the conditions limit updates to circumstances where the workflow being used is a specific workflow. The conditions also limit updates to triggering events that relate to print, insert, and mail activities. This type of granular, user-defined and dynamic history generation makes it substantially easier for a print shop operator to analyze specific portions of complex processes that are ongoing at the print shop.

FIG. 5 is a block diagram illustrating a history file 500 in an exemplary embodiment. In this embodiment, the history file includes multiple entries that each correspond with a single row of data. Each entry includes a field for a timestamp indicating when the triggering event was detected, a field for event type indicating what type of triggering event was detected, a state indicating a state of the document with respect to the event, a field for activity indicating the workflow activity that was being performed for the document when the triggering event was detected, and a field for workflow indicating what type of workflow was being processed at the time. Tracking the type of workflow can be beneficial in embodiments where the history file tracks properties for documents across multiple print jobs, which each may be associated with a different workflow.

Figure 6:
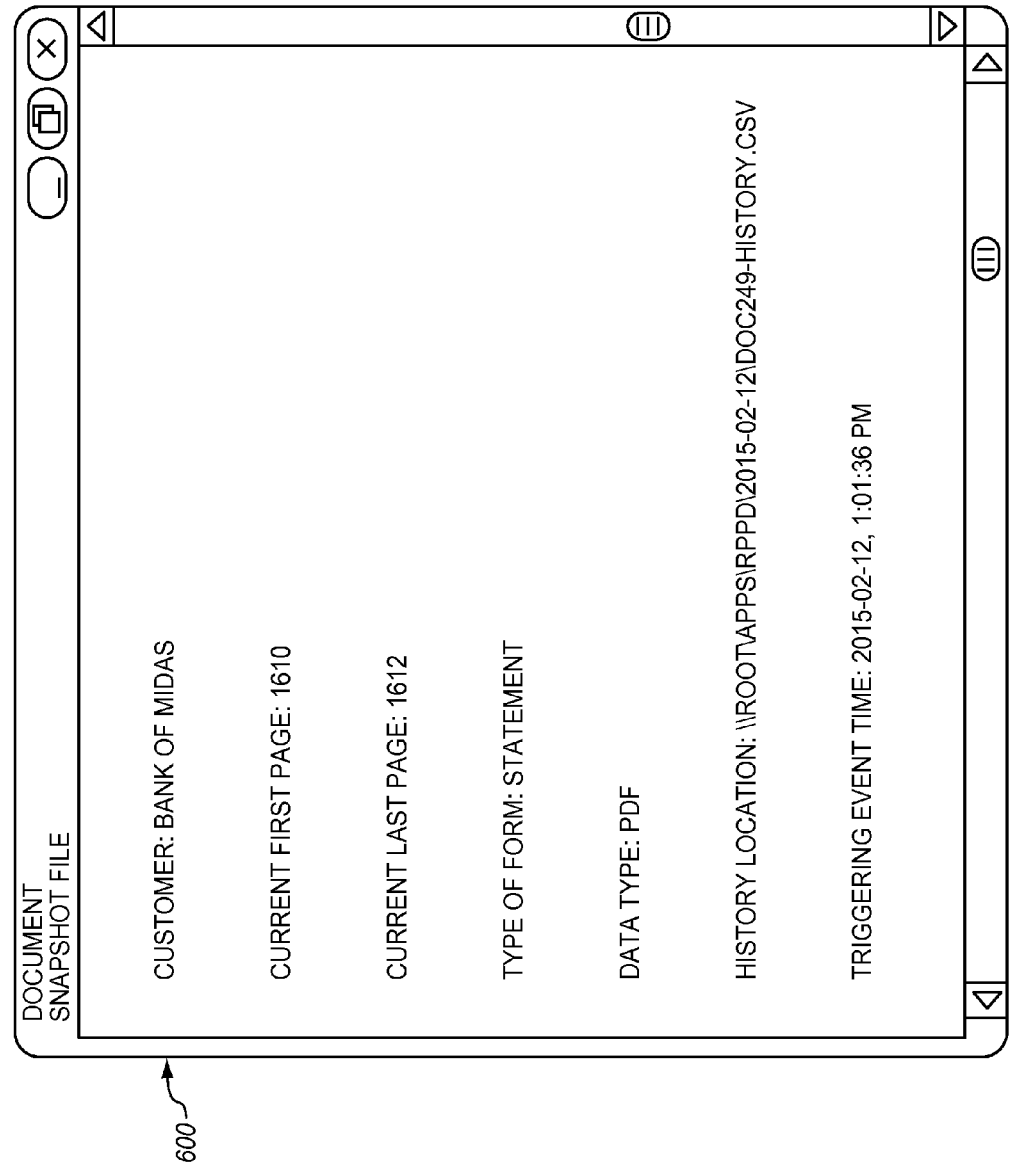
FIG. 6 is a block diagram illustrating a snapshot file accompanying a history file in an exemplary embodiment.

FIG. 6 is a block diagram illustrating a snapshot file 600 accompanying a history file in an exemplary embodiment. In this embodiment, a new snapshot file is generated to accompany an entry in the history file, whenever a new entry is added to the history file. The snapshot file includes a wider variety of document properties at the time of the triggering event than the entry in the history file does. As shown in FIG. 6, snapshot file 600 indicates the customer that sourced the document, a first page of the document in a print file for the entire print job, a last page of the document in the print file, a type of form for the document (in this case, an account statement, instead of for example a copy of a book or report), a data type for the document indicating the PDL used to describe the document, a location of the history file on a shared file server, and a time that the triggering event was detected. Further document properties may be placed into the snapshot file by the controller as desired, based on the user-configurable settings of the tracking object described in FIG. 4. Using a snapshot file in addition to a history file allows the history file to be smaller and therefore more easily searchable.

Figure 7:
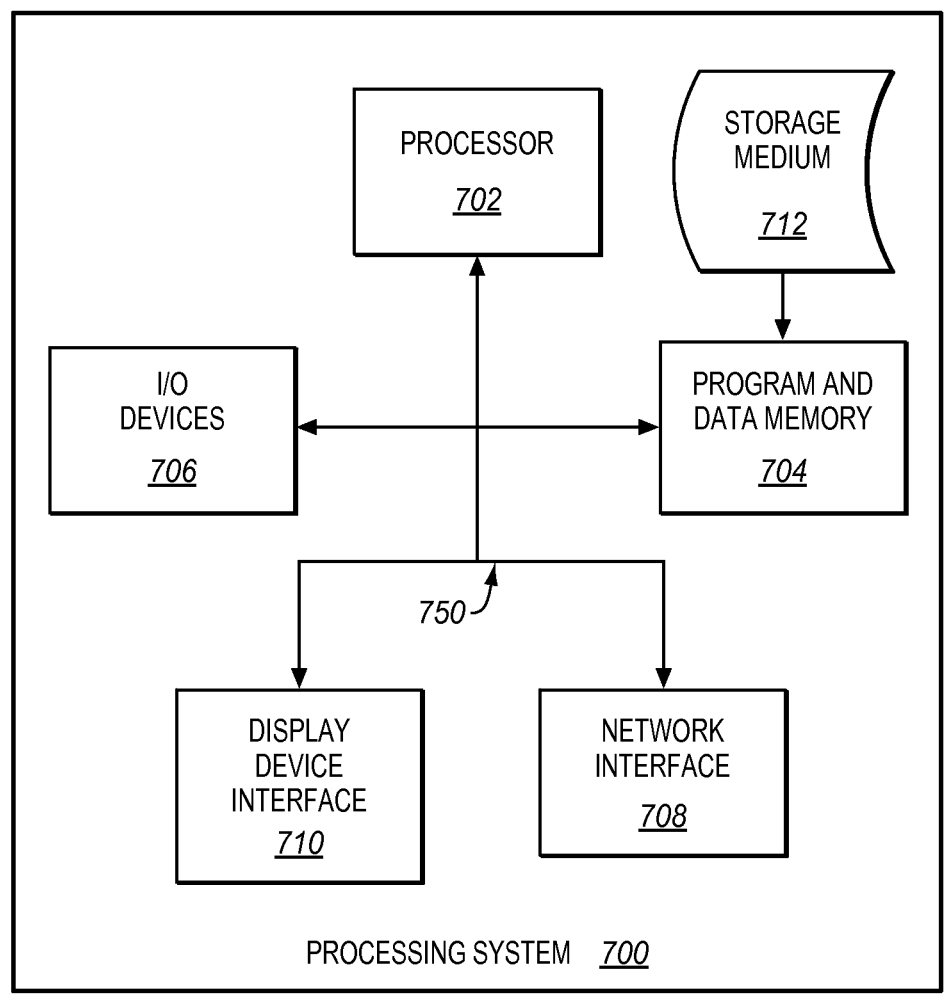
FIG. 7 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of workflow server 120 to perform the various operations disclosed herein. FIG. 7 illustrates a processing system 700 operable to execute a computer readable medium embodying programmed instructions to perform desired functions in an exemplary embodiment. Processing system 700 is operable to perform the above operations by executing programmed instructions tangibly embodied on computer readable storage medium 712. In this regard, embodiments of the invention can take the form of a computer program accessible via computer-readable medium 712 providing program code for use by a computer or any other instruction execution system. For the purposes of this description, computer readable storage medium 712 can be anything that can contain or store the program for use by the computer.

Computer readable storage medium 712 can be an electronic, magnetic, optical, electromagnetic, infrared, or semiconductor device. Examples of computer readable storage medium 712 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 700, being suitable for storing and/or executing the program code, includes at least one processor 702 coupled to program and data memory 704 through a system bus 750. Program and data memory 704 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 706 (including but not limited to keyboards, displays, pointing devices, etc.) can be coupled either directly or through intervening I/O controllers. Network adapter interfaces 708 may also be integrated with the system to enable processing system 700 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 710 may be integrated with the system to interface to one or more display devices, such as printing systems and screens for presentation of data generated by processor 702.

Although specific embodiments were described herein, the scope of the invention is not limited to those specific embodiments. The scope of the invention is defined by the following claims and any equivalents thereof.

We claim:

1. An apparatus comprising:
   a workflow server comprising:
      an interface configured to receive a print job that defines multiple documents; and
      a controller, implemented by a processor and memory, configured to direct devices of a print shop in accordance with a print workflow that comprises an ordered set of activities to perform upon the documents, wherein each activity has a queued state, a processing state, and a complete state,
      wherein the controller is configured to identify properties of each of the documents to track while the print job is being processed in the workflow, to receive progress information from the devices, and to analyze the progress information to detect a triggering event indicating that a document in the workflow has transitioned to a new state at an activity,
      wherein the controller is configured to analyze recording criteria for the document to determine whether to update a history for the document in response to the triggering event, and when the criteria direct the controller to update the history, the controller is configured to add an entry to a history file for the document while the document is in the workflow, wherein the entry indicates values of the properties of the document during the triggering event, and a current workflow activity for the document during the triggering event.

2. The apparatus of claim 1 wherein:
   the properties indicate the new state for the document and include a time stamp defining when the new state was reached.

3. The apparatus of claim 2 wherein:
   the controller is configured to analyze the progress information by identifying a current page of the print job indicated by the progress information, and correlating the current page with a document of the print job.

4. The apparatus of claim 1 wherein:
   when the criteria direct the controller to update the history, the controller is configured to generate a snapshot file that indicates additional properties of the document during the triggering event.

5. The apparatus of claim 1 wherein:
   the controller is configured to continuously monitor the properties for each of the documents.

6. The apparatus of claim 1 wherein:
   the controller is configured to detect multiple triggering events, and to add an entry to the history file for the document each time a triggering event is detected.

7. The apparatus of claim 1 wherein:
   the recording criteria define multiple conditions, linked by one or more logical operators, wherein each condition refers to a specific workflow activity.

8. A method comprising:
   receiving a print job that defines multiple documents;
   directing devices of a print shop in accordance with a print workflow that comprises an ordered set of activities to perform upon the documents, wherein each activity has a queued state, a processing state, and a complete state,
   identifying properties of each of the documents to track while the print job is being processed in the workflow;
   receiving progress information from the devices;
   analyzing the progress information to detect a triggering event indicating that a documents in the workflow has transitioned to a new state at an activity,
   analyzing recording criteria for the document to determine whether to update a history for the document in response to the triggering event; and
   when the criteria indicate an update to the history, adding an entry to a history file for the document while the document is in the workflow, wherein the entry indicates values of the properties of the document during the triggering event, and a current workflow activity for the document during the triggering event.

9. The method of claim 8 wherein:
   the properties indicate the new state for the document and include a time stamp defining when the new state was reached.

10. The method of claim 9 further comprising:
    analyzing the progress information by identifying a current page of the print job indicated by the progress information, and correlating the current page with a document of the print job.

11. The method of claim 8 wherein:
    when the criteria indicate an update to the history, generating a snapshot file that indicates additional properties of the document during the triggering event.

12. The method of claim 8 further comprising:
    continuously monitoring the properties for each of the documents.

13. The method of claim 8 further comprising:
    detecting multiple triggering events; and
    adding an entry to the history file for the document each time a triggering event is detected.

14. The method of claim 8 wherein:
    the recording criteria define multiple conditions, linked by one or more logical operators, wherein each condition refers to a specific workflow activity.

15. A non-transitory computer readable medium embodying programmed instructions which, when executed by a processor, are operable for performing a method comprising:
    receiving a print job that defines multiple documents;
    directing devices of a print shop in accordance with a print workflow that comprises an ordered set of activities to perform upon the documents, wherein each activity has a queued state, a processing state, and a complete state,
    identifying properties of each of the documents to track while the print job is being processed in the workflow;

receiving progress information from the devices;

analyzing the progress information to detect a triggering event indicating that a documents in the workflow has transitioned to a new state at an activity, analyzing recording criteria for the document to determine whether to update a history for the document; in response to the triggering event; and when the criteria indicate an update to the history, adding an entry to a history file for the document while the document is in the workflow, wherein the entry indicates values of the properties of the document during the triggering event, and a current workflow activity for the document during the triggering event.

16. The medium of claim 15 wherein:

the properties indicate the new state for the document and include a time stamp defining when the new state was reached.

17. The medium of claim 16 wherein:

analyzing the progress information by identifying a current page of the print job indicated by the progress information, and correlating the current page with a document of the print job.

18. The medium of claim 15 wherein:

when the criteria indicate an update to the history, generating a snapshot file that indicates additional properties of the document during the triggering event.

19. The medium of claim 15 wherein the method further comprises:

continuously monitoring the properties for each of the documents.

20. The medium of claim 15 wherein the method further comprises:

detecting multiple triggering events; and adding an entry to the history file for the document each time a triggering event is detected.

* * * * *